No. 666,910. Patented Jan. 29, 1901.
H. B. RUGGLES.
AUTOMATIC WEIGHING MACHINE.
(Application filed Dec. 26, 1899.)
(No Model.)
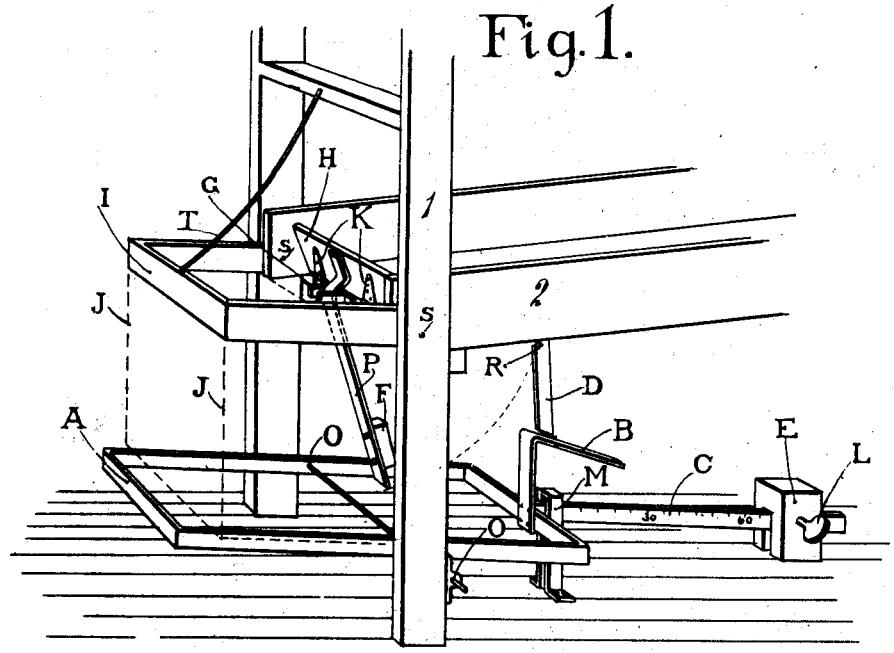
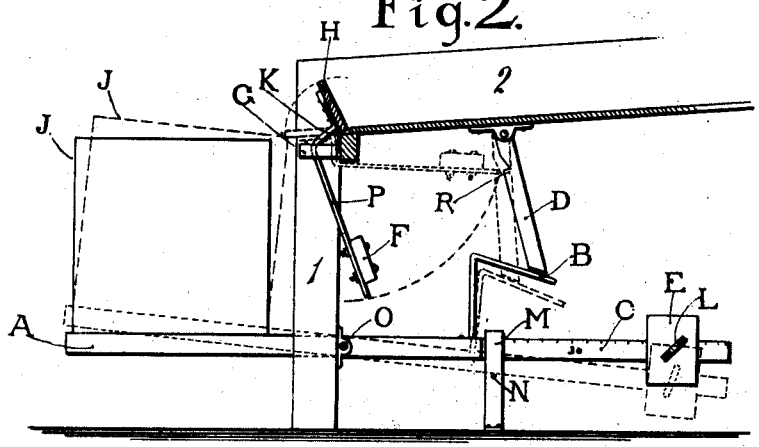
Witnesses
Mary M. Stirling
A. B. Ruggles
Inventor
Henry B. Ruggles

UNITED STATES PATENT OFFICE.

HENRY B. RUGGLES, OF REDLANDS, CALIFORNIA.

AUTOMATIC WEIGHING-MACHINE.

SPECIFICATION forming part of Letters Patent No. 666,910, dated January 29, 1901.

Application filed December 26, 1899. Serial No. 741,667. (No model.)

*To all whom it may concern:*

Be it known that I, HENRY B. RUGGLES, a citizen of the United States, residing at Redlands, in the county of San Bernardino and State of California, have invented a new and useful Automatic Weighing-Machine, of which the following is a specification.

This invention is designed for use in filling boxes or other receptacles with fruit or other material.

The object of the invention is to provide automatic means for regulating the weight of the filled receptacles.

The invention may be carried out in various ways. In the accompanying drawings I have illustrated the invention as the same is applied in connection with the ordinary grading table or hopper used in the assorting of fruit and in which the fruit is conducted by gravity along an inclined chute or runway from the grading-table to the box or other receptacle.

It is an object of this invention to automatically weigh the fruit uniformly and to automatically cut off the fruit to prevent the fruit from running over the top of the box, thus saving time in weighing and adding to the convenience in handling.

The accompanying drawings illustrate my invention.

Figure 1 is a perspective view of the device ready to receive a box to be filled with fruit. The box is indicated by dotted lines in position for filling. Fig. 2 is a sectional elevation of the same, showing the position of the parts when the box has been filled with the proper quantity of fruit. The positions of the parts when the box is in position to be filled are indicated in dotted lines.

In the drawings the counterpoised platform or frame A is attached to the framework 1, which supports the chute 2, which leads from the grading-table.

J indicates a box on the platform for receiving the fruit.

I indicates a frame pivoted to the framework 1 and suspended by a rope T. The purpose of the frame I is to form an upward extension above the top of the box J to prevent the fruit from running over the top of the box when the box is full. This frame may be omitted, if desired, and is not shown in Fig. 2.

H indicates a gate pivoted at the end of the chute 2 and arranged for normally closing the chute. Suitable means are provided for normally closing the gate against the fruit, and these means are sufficiently strong to stop the flow of the fruit down the chute whenever the gate-closing means are free to act to close the gate. The gate-closing means shown in the drawings comprises an arm or lever P, which is fixed to the gate H and is provided with a weight F to normally overbalance the gate and hold it in its closed position, as indicated in solid lines in the drawings.

D indicates a latch or catch having a notch R, into which the end of the lever P will be caught when the gate H is pushed down into the position indicated in dotted lines in Fig. 2 to allow the fruit to flow down the chute.

The counterpoised platform A is pivoted to the framework 1 by the journals O.

C indicates a weight-bar fastened to and extending rearward from the platform A and provided with a movable weight E to counterbalance the platform and the box and any fruit in the box until the box is properly filled.

L indicates a set-screw for fixing the weight E at the appropriate place on the weight-bar C to allow the platform to tilt when the box is properly filled.

M indicates a stop for preventing the bar from lifting beyond a certain point, and N indicates a stop to prevent the bar from dropping too far. The stop N is located at a point to hold the platform in position for holding the box up in the filling position. (Shown in dotted lines in Fig. 2.)

B indicates the catch-operating arm constituting means connected with the counterpoised platform for throwing the catch D to release the arm P to allow the gate to close when the counterpoise of the platform is overbalanced.

S indicates pivot-bolts on which the frame I is hung.

G indicates a spring to press against the side of the arm or lever P to frictionally engage the same to prevent it from swinging back and forth after it has dropped into its gate-closing position.

K indicates hinges on which the gate is pivoted.

In practice the attendant after placing the box J on the platform and bringing the frame I down on top of the box will press the gate H open with his hand, thus allowing the fruit to roll from the chute 2 down into the box. When the gate is brought down into the position shown in dotted lines in Fig. 2, the lower end of the lever P will come into the notch R in the catch D and will be held in position to retain the gate open until the box is properly filled. When the box is properly filled, the weight of the box and fruit will tilt the platform A, thus bringing the arm B into position to release the catch D and allow the weighted arm or lever P to fall into the position shown in solid lines in Fig. 2, thus closing the gate and preventing any more fruit from running into the box. The filled box will then be removed and an empty box be placed in position, and the operation just described will then be repeated.

What I claim, and desire to secure by Letters Patent of the United States, is—

1. An automatic weighing-machine, comprising a sloping trough; a pivoted gate for closing the mouth of the trough; a weighted arm fastened to the gate to normally hold the gate upright across the mouth of the trough to close it; a latch pivoted rearwardly of the mouth of the trough, and provided with a catch to hold the weighted arm up and thereby hold the gate down, to form a continuation of the floor of the trough; a counterpoised platform pivoted below the mouth of the trough for holding a receptacle to receive the discharge from the trough; and an arm extending upward from the platform to throw the latch to release the weighted arm when the counterpoise is overbalanced.

2. The combination of a chute; a pivoted gate for normally closing the chute; a counterpoised pivoted platform for holding a receptacle to receive the discharge from the chute; a pivoted frame to form an upward extension of the receptacle in front of the chute, such receptacle mounted on said platform; means for holding the gate open; and means connected with the counterpoised platform for releasing the gate-holding means to allow the gate to close when the counterpoise of the platform is overbalanced.

3. In an automatic weighing-machine, the combination with a chute, and a pivoted platform for holding a receptacle in front of the chute; of a pivoted frame to form a forward extension of the chute and to form an upward extension above a receptacle on the platform and to form a barrier around the top of the same.

4. In an automatic weighing-machine, the combination of a chute; a gate pivoted to close the chute; a weighted arm to throw the gate into its closed position; means for temporarily holding the weighted arm in position with the gate open; means for releasing the arm; and a spring arranged to frictionally engage the arm to prevent it from vibrating when in its gate-closing position.

In testimony whereof I have signed my name to this specification, in the presence of two subscribing witnesses, at Redlands, California, this 14th day of December, 1899.

HENRY B. RUGGLES.

Witnesses:
 F. LOUISE PHELPS,
 CHAS. E. TRUESDELL.